United States Patent
Wei et al.

(10) Patent No.: US 9,857,838 B2
(45) Date of Patent: Jan. 2, 2018

(54) INFORMATION PROCESSING METHOD AND ELECTRONIC DEVICE WITH AUTO ADJUSTABLE WORKING MODE WITH DIFFERENT WEARING POSITIONS

(71) Applicant: Lenovo (Beijing) Co., Ltd., Beijing (CN)

(72) Inventors: Zhiyu Wei, Beijing (CN); Chao Dong, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 350 days.

(21) Appl. No.: 14/639,271

(22) Filed: Mar. 5, 2015

(65) Prior Publication Data

US 2016/0187920 A1   Jun. 30, 2016

(30) Foreign Application Priority Data

Dec. 31, 2014 (CN) .......................... 2014 1 0855886

(51) Int. Cl.
| | |
|---|---|
| *G05B 13/02* | (2006.01) |
| *G09G 5/00* | (2006.01) |
| *G04B 19/00* | (2006.01) |
| *G06F 1/16* | (2006.01) |
| *G05B 15/02* | (2006.01) |
| *G06F 1/32* | (2006.01) |

(52) U.S. Cl.
CPC ............. *G06F 1/163* (2013.01); *G05B 15/02* (2013.01); *G06F 1/3231* (2013.01); *Y02B 60/1289* (2013.01)

(58) Field of Classification Search
CPC .................................................... G05B 11/42
USPC ............................................................ 700/40
See application file for complete search history.

(56) References Cited

U.S. PATENT DOCUMENTS

| | | | |
|---|---|---|---|
| 9,606,721 B2 * | 3/2017 | Park ....................... | G06F 1/3246 |
| 2014/0125618 A1 | 5/2014 | Panther et al. | |
| 2015/0022438 A1 * | 1/2015 | Hong .................. | H04M 1/7253 |
| | | | 345/156 |

(Continued)

FOREIGN PATENT DOCUMENTS

| CN | 103744531 A | 4/2014 |
|---|---|---|
| EP | 2827226 A2 | 1/2015 |

OTHER PUBLICATIONS

First German Office Action regarding Application No. 10 2015 104 426.9 dated Oct. 20, 2015. English translation provided by Unitalen Attorneys at Law.

*Primary Examiner* — Suresh Suryawanshi
(74) *Attorney, Agent, or Firm* — Harness, Dickey & Pierce, P.L.C.

(57) ABSTRACT

An information processing method and an electronic device are provided. The method includes: detecting a characteristic parameter of an electronic device by a sensing unit of the electronic device; determining wearing position data of the electronic device based on the characteristic parameter, where the wearing position data indicates a positional relation between the electronic device and a wearer when a fixed relation between the electronic device and at least a part of body of the wearer is maintained by a fixing element of the electronic device; and controlling the electronic device to operate in a working mode matching with the wearing position data.

9 Claims, 5 Drawing Sheets

(56) References Cited

U.S. PATENT DOCUMENTS

2015/0026647 A1* 1/2015 Park .................. G06F 3/0488
715/863
2015/0205994 A1* 7/2015 Yoo .................. G04G 21/00
368/223

* cited by examiner

INFORMATION PROCESSING METHOD AND ELECTRONIC DEVICE WITH AUTO ADJUSTABLE WORKING MODE WITH DIFFERENT WEARING POSITIONS

This application claims priority to Chinese patent application No. 201410855886.8, titled "INFORMATION PROCESSING METHOD AND ELECTRONIC DEVICE" and filed with the Chinese State Intellectual Property Office on Dec. 31, 2014, which is incorporated herein by reference in its entirety.

FIELD

The disclosure relates to the field of the electronic technology, and in particular to an information processing method and an electronic device.

BACKGROUND

With the development of electronic technology, the various electronic devices have more and more functions, which brings great convenience to people's life. Especially, wearable devices appeared in recent years greatly meet people's requirement on portability and intelligence, and thus are popular among users.

Different users have different wearing habits even for the same wearable device, and the users may wear the wearable device at different parts of body. Even the same user may wear the electronic device at different parts of body in different scenes. The interaction habit of the user for the different wearing position is also different. The wearable device can not adjust its working mode for different wearing positions, and the user can not operate the wearable device in an interaction mode corresponding to the current wearing position.

SUMMARY

In a first aspect, an information processing method is provided according to an embodiment of the application, which includes: detecting a characteristic parameter of an electronic device by a sensing unit of the electronic device; determining wearing position data of the electronic device based on the characteristic parameter, where the wearing position data indicates a positional relation between the electronic device and a wearer when a fixed relation between the electronic device and at least a part of body of the wearer is maintained by a fixing element of the electronic device; and controlling the electronic device to operate in a working mode matching with the wearing position data.

In a second aspect, an electronic device is provided according to an embodiment of the application, which includes: a fixing element, configured to have at least a fixed state in which the fixing element forms at least a portion of an annulus; and a functional main body, capable of maintaining a connection with the fixing element and capable of being fixed around at least a part of body of a wearer by the fixing element. The functional main body includes: a display unit located on a first surface of the functional main body; a sensing unit, configured to detect a characteristic parameter of the electronic device; and a processor connected to the display unit and the sensing unit, and configured to: determine wearing position data of the electronic device based on the characteristic parameter, where the wearing position data indicates a positional relation between the electronic device and the wearer when a fixed relation between the electronic device and the at least a part of body of the wearer is maintained by the fixing element of the electronic device; and control the electronic device to operate in a working mode matching with the wearing position data.

BRIEF DESCRIPTION OF THE DRAWINGS

In order to illustrate technical solutions of embodiments of the application more clearly, drawings for the description of the embodiments will be introduced briefly below. Apparently, the drawings described below are only some of embodiments of the application, and other drawings may be obtained based on these drawings by those skilled in the art without any creative work.

DETAILED DESCRIPTION OF EMBODIMENTS

An information processing method is provided according to an embodiment of the application, which includes: detecting a characteristic parameter of an electronic device by a sensing unit of the electronic device; determining wearing position data of the electronic device based on the characteristic parameter, where the wearing position data indicates a positional relation between the electronic device and a wearer when a fixed relation between the electronic device and at least a part of body of the wearer is maintained by a fixing element of the electronic device; and controlling the electronic device to operate in a working mode matching with the wearing position data.

In the information processing method provided by the embodiment of the application, current wearing position data of the electronic device is determined based on the characteristic parameter detected by the sensing unit, i.e., the wearing position of the electronic device is determined; and the electronic device is controlled to operate in a working mode matching with the wearing position data. In the working mode, the user can use the electronic device in a habitual interaction mode for the current wearing position. Therefore, user experience of the electronic device is improved and efficiency for processing task of the electronic device by the user is also improved.

Technical solutions of the disclosure will be illustrated in detail below in conjunction with the drawings and embodiments. It should be understood that the embodiments of the application and features in the embodiments are detailed illustrated for description of the technical solutions of the disclosure, but are not intent to limit the technical solutions of the disclosure. The embodiments of the application and the technical features in the embodiments can be combined in a case of no conflict.

First Embodiment

Figure 1:
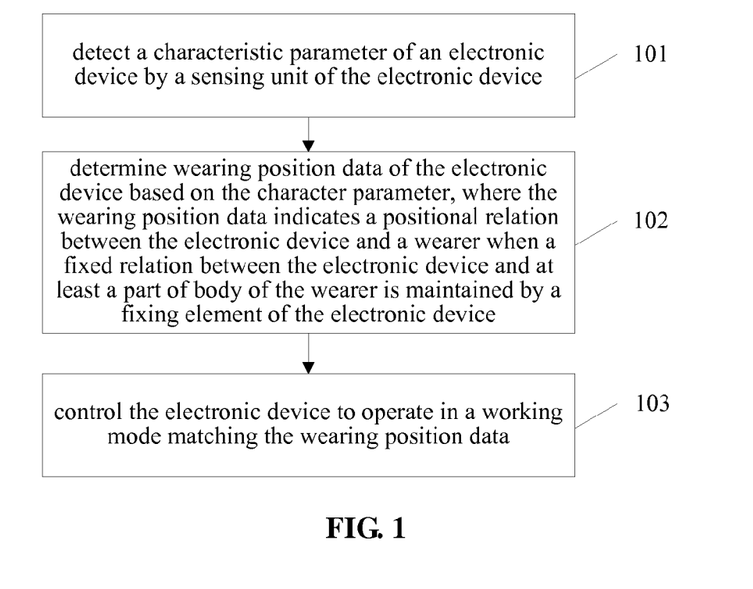
FIG. 1 is a schematic flowchart of an information processing method according to a first embodiment of the application.

An information processing method is provided according to the first embodiment of the application. Reference is made to FIG. 1 which is a schematic flowchart of the information processing method. The method includes following steps.

In step 101, a characteristic parameter of an electronic device is detected by a sensing unit of the electronic device.

In step 102, wearing position data of the electronic device is determined based on the characteristic parameter. The wearing position data indicates a positional relation between the electronic device and a wearer when a fixed relation between the electronic device and at least a part of body of the wearer is maintained by a fixing element of the electronic device.

In step 103, the electronic device is controlled to operate in a working mode matching with the wearing position data.

Figure 2:
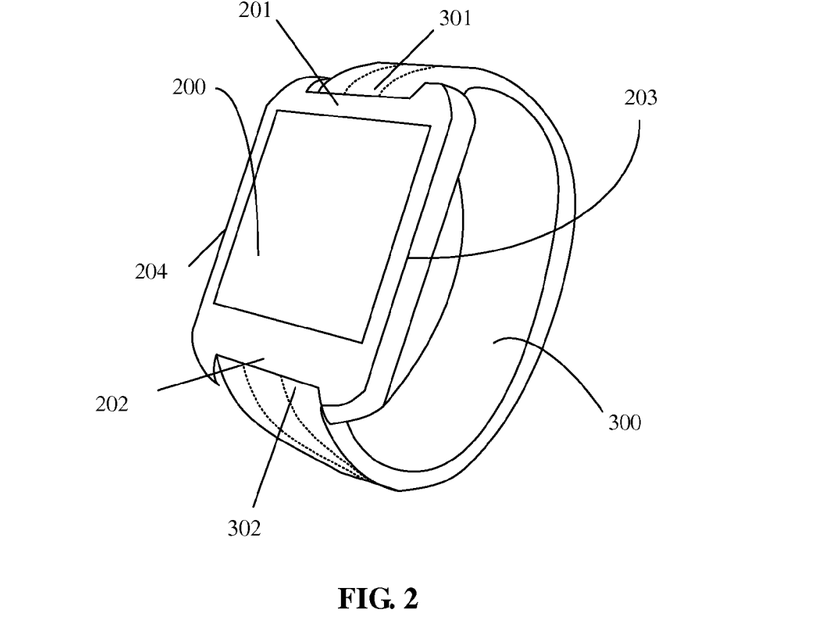
FIG. 2 is a schematic diagram of an electronic device according to an embodiment of the application.

Referring to FIG. 2, the electronic device is a wearable device which includes a functional main body and a fixing element. A fixed relation between the electronic device and at least a part of body of the wearer is maintained by the fixing element of the electronic device, i.e., the electronic device is worn on a part of body of the wearer by the fixing element. For example, the electronic device is a smart watch, the fixing element is a watch strap of the smart watch, and the functional main body is a main part of the smart watch including a mainboard, a processor and a display unit.

The characteristic parameter is a parameter which represents a current state of the electronic device. The wearing position data representing a positional relation between the electronic device and the wearer can be determined based on the characteristic parameter, that is, a wearing position of the electronic device can be determined based on the characteristic parameter.

The sensing unit is configured to detect the characteristic parameter. Generally the sensing unit is arranged on the functional main body, but the sensing unit may be also arranged on the fixing element. The positional relation between the electronic device and the wearer may be determined based on different characteristic parameters, and thus different sensing units may be used to collect the different characteristic parameters.

For example, the characteristic parameter may be spatial data of different parts of the functional main body. The spatial data may be used to determine spatial position variations of different parts of the functional main body when the user uses the electronic device. The spatial position variations of different parts of the functional main body are different if the electronic device is worn at different positions, and thus the positional relation between the electronic device and the wearer, i.e., the wearing position of the electronic device, can be determined based on the spatial data (characteristic parameters) of different parts of the functional main body. In this case, the sensing unit may be a sensing device detecting absolute spatial position data of different parts of the functional main body, such as a gyroscope or an acceleration sensor. The sensing unit may also be a sensing device detecting relative spatial position data of different parts of the functional main body, such as a level gauge or an angle sensor.

For example, the characteristic parameter may be a status bit indicating connection between the fixing element and the functional main body. Different status bits represent different connection relations between the fixing element and the functional main body, and different connection relations between the fixing element and the functional main body indicate that the electronic device is worn on different parts of body of the user (the wearer). For example, if the fixing element and the functional main body are in a first connection relation, the characteristic parameter (the status bit) is 1, and the electronic device is worn on the left hand of the user; and if the fixing element and the functional main body are in a second connection relation, the characteristic parameter (the status bit) is 0, and the electronic device is worn on the right hand of the user. In this case, the sensing unit is a sensing device detecting whether the status bit indicating connection between the fixing element and the functional main body is 0 or 1, and the wearing position of the electronic device can be determined based on the status bit detected by the sensing unit.

In step 103, after the wearing position data is determined, i.e., after the wearing position of the electronic device is determined, the electronic device is controlled to operate in a working mode matching with the wearing position data, such that the wearer can interact with the electronic device in a mode matching with the current wearing position of the electronic device and conforming the habit of the wearer. In implementation, there are three cases. The first case is that, the electronic device is set to operate in a working mode matching with the currently determined wearing position data when the electronic device is initialized (started). The second case is that, first wearing position data corresponding to a first working mode is determined when the electronic device operates in the first working mode and the electronic device is controlled to maintain the first working mode. The third case is that, second wearing position data corresponding to a second working mode is determined when the electronic device operates in a first working mode and the working mode of the electronic device is switched to the second working mode.

In the information processing method provided by the embodiment of the application, the current wearing position data of the electronic device can be determined based on the characteristic parameter detected by the sensing unit, i.e., the wearing position of the electronic device is determined, and the electronic device is controlled to operate in the working mode matching with the wearing position data. In this working mode, the user can use the electronic device in a habitual interaction mode for the current wearing position. Therefore, user experience of the electronic device is improved and efficiency for processing task of the electronic device by the user is also improved.

Optionally, in step 103, there are at least two aspects for controlling the electronic device to operate in a working mode matching with the wearing position data.

In the first aspect, the electronic device is controlled to display a display object in a display mode matching with the wearing position data.

Specifically, there are at least two cases for displaying in different modes for different wearing position data.

In the first case, the display unit of the electronic device has different orientations relative to the visual angle of the user for different wearing positions of the electronic device. Therefore, a forward display direction of the display unit of the electronic device is set to be a direction corresponding to the wearing position data, which facilitates the user to watch the content displayed on the electronic device. The forward display direction refers to a direction from the upper side of the display object to the lower side of the display object in displaying the display object by the display unit. In other words, the top (upper) side of the display region of the display unit is different for different wearing position data.

In a second case, the region in the display region of the electronic device which is convenient for the user to watch is different for different wearing positions of the electronic device. For example, if the smart watch is worn on the left hand of the user, the right region of the display unit of the smart watch (which is close to the right hand) is convenient for the user to watch since this region is not likely to be sheltered by clothes, and in addition, this region is convenient for the user to perform a touch operation with the right hand. Therefore, the electronic device displays the display object on a region of the display region corresponding to the wearing position data, which facilitates the user to watch or operate the display object on the display unit. For example, the electronic device displays the display object on a region close to one side of the display unit for one type of wearing position data while displaying the display object on a region close to another side of the display unit for another type of wearing position data.

In the second aspect, the electronic device is controlled to respond to an input operation of the user in a response mode matching with the wearing position data.

Specifically, there are at least two cases for responding in different response modes for different wearing position data.

In the first case, requirements on touch operations on the wearable device are less and the types of the designed touch operations are also less, so whether the electronic device being worn on the left side or right side of body of the user has little influence on using of the electronic device by the user. As development of the intelligent wearable devices, operation requirements of the wearable device in a wearing state, such as touch operation requirement, increase, and the types of touch operations also increase. The portion of the electronic device which is convenient for the user to operate is different for different wearing positions of the electronic device. In order to facilitate the user to operate the electronic device, operable controls are respectively arranged at multiple portions of the electronic device, and the electronic device controls the operable control at a portion corresponding to the current wearing position data to be in an enabled state, i.e., a working state, and controls operable controls at other portions to be in a state not responding to the operation of the user. For example, strip touch control devices are respectively arranged on the left side and right side of the smart watch, the strip touch control device on the right side is enabled and the strip touch control device on the left side is disabled when the smart watch is worn on the left hand of the user since the user operates the touch control device on the right side more easily, and the strip touch control device on the left side is enabled and the strip touch control device on the right side is disabled when the smart watch is worn on the right hand of the user since the user operates the touch control device on the left side more easily.

In the second case, the user habitually adopts different gestures to interact with the electronic device for different wearing positions of the electronic device. In order to facilitate the user to operate the electronic device, the electronic device parses a gesture corresponding to the current wearing position data into a preset instruction. For example, the electronic device parses a touch gesture of the user towards to a side edge A of the electronic device into an instruction of returning to a previous menu for one type of wearing position data; and the electronic device parses a gesture of the user towards to a side edge B into an instruction of returning to a previous menu and parses the gesture towards to the side edge A into an instruction of opening or entering into the submenu for another type of wearing position data.

Optionally, in a first possible implementation of the information processing method provided by the embodiment of the application, the electronic device detects spatial data of the electronic device by a first sensing unit, where the spatial data is the characteristic parameter.

Specifically, the spatial data may be spatial movement data, for example, speed (moving) direction of the electronic device in a moving process. The spatial data may also be spatial posture data, which may be posture data of different portions of the electronic device in a static state or posture data of different portions of the electronic device in a moving state. Different first sensing units may be adopted for different spatial data, which will be described in the following.

Referring to FIG. 2 again, in the embodiment of the application, the functional main body of the electronic device includes a first side edge 201 and a second side edge 202 which are opposite to each other and a third side edge 203 and a fourth side edge 204 which are opposite to each other. The first side edge 201, the third side edge 203, the second side edge 202 and the fourth side edge 204 are connected in turn and end-to-end. The first side edge 201 and the second side edge 202 correspond to the fixing element. The first side edge 201 and the second side edge 202 corresponding to the fixing element refers to that, the two side edges corresponding to the fixing element are respectively connected to a first end 301 and a second end 302 when the fixing element is in a fixed state, i.e., the first end 301 and the second end 302 are connection ends between the functional main body and the fixing element; or if the functional main body is adhered to or embedded in a surface of the fixing element, the first end 301 and the second end 302 are two ends contacting with the surface. In other words, in a case that the fixing element in a fixed state presents an annular shape (including a partial annular shape), the four side edges of the annular fixing element include a set of long side edges and a set of short side edges (particularly, the fixing element has only two long side edges if the fixing element presents an entire annular shape), the first side edge 201 and the second side edge 202 of the functional main body correspond to the two short side edges of the fixing element, and the third side edge 203 and the fourth side edge 204 of the functional main body correspond to the two long side edges of the fixing element.

Optionally, in conjunction the first possible implementation of the information processing method, the wearing position data of the electronic device may be determined based on position variations of different portions of the electronic device during a relative ascent process of the electronic device.

Specifically, during the relative ascent process of the electronic device, position varying data of the third side edge 203 and the fourth side edge 204 in a relative ascent direction of the electronic device is detected by the first sensing unit. It is determined that the wearing position data is first wearing position data in a case that the position varying data indicates that position variation of the third side edge 203 in the relative ascent direction is greater than position variation of the fourth side edge 204 in the relative ascent direction. The first wearing position data indicates that the electronic device is worn on the left part of body of the wearer. It is determined that the wearing position data is second wearing position data in a case that the position varying data indicates that position variation of the fourth side edge 204 in the relative ascent direction is greater than position variation of the third side edge 203 in the relative ascent direction. The second wearing position data indicates that the electronic device is worn on the right part of body of the wearer.

The relative ascent direction refers to a direction along which the part of body of the user wearing the electronic device moves towards the head of the user, when, for example, the user watches the electronic device. For example, the electronic device is a smart watch and the smart watch is worn on the arm of the user, the relative ascent direction refers to an upward direction away from the ground in a case that the standing user raises the arm to watch the smart watch, and the relative ascent direction refers to a direction from the leg of the user to the head of the user in a case that the user lies on the bed and moves the arm from a position close to the leg to a position close to the head to watch the smart watch.

In a case that the smart watch is worn on the left hand of the user, the position of the fourth side edge 204 is higher than the position of the third side edge 203 in the relative ascent direction (a upward direction from the ground when the user stands) if the user does not watch the smart watch and the left hand of the user falls naturally, and the height of the third side edge 203 is substantially the same as or greater than the height of the fourth side edge 204 in the relative ascent direction if the user wants to watch the smart watch and raises the arm to a (substantially) horizontal position close to the head. In other words, during the relative ascent process of the electronic device, the position variation of the third side edge 203 in the relative ascent direction is greater than the position variation of the fourth side edge 204 in the relative ascent direction. Similarly, in a case that the smart watch is worn on the right hand of the user, the position variation of the fourth side edge 204 in the relative ascent direction is greater than the position variation of the third side edge 203 in the relative ascent direction during the relative ascent process of the electronic device. Therefore, the wearing position data of the electronic device can be determined based on the position variations of the third side edge 203 and the fourth side edge 204 during the relative ascent process of the electronic device.

In an implementation, absolute values of spatial position variations of the third side edge 203 and the fourth side edge 204 during the relative ascent process may be detected separately, and then the two absolute values are compared. In this implementation, the first sensing unit is a sensing device for collecting an absolute value of spatial position variation, for example, a high precision positioning device or an acceleration sensor. The position variation of each side edge in the relative ascent direction may be calculated by the acceleration sensor.

In addition, relative variation of spatial positions of the third side edge 203 and the fourth side edge 204 during the relative ascent process may be detected by the first sensing unit. For example, the first sensing unit is a level gauge or an angle sensor, which can detect an angle between a perpendicular bisector of the third side edge 203 and a plane perpendicular to the relative ascent direction (i.e., the horizontal plane in a case that the user stands) and an angle between a perpendicular bisector of the fourth side edge 204 and the plane perpendicular to the relative ascent direction. It may be determined that the position variation of the third side edge 203 in the relative ascent direction is greater than the position variation of the fourth side edge 204 in the relative ascent direction in a case that the data detected by the first sensing unit indicates that the angle changes from a greater value to a smaller value and the position of the fourth side edge 204 is higher than the position of the third side edge 203 in the relative ascent direction when the angle is the greater value.

Optionally, in conjunction with the first possible implementation of the information processing method, the wearing position of the electronic device may be determined based on a motion component of the electronic device in a plane perpendicular to the relative ascent direction during the relative ascent process of the electronic device.

The direction of the speed component of the electronic device in the plane perpendicular to the relative ascent direction may be detected by the first sensing unit during the relative ascent process of the electronic device. The side edge that the speed component points to is determined in a case that the speed component is in a plane where a display surface of the display unit of the electronic device is located. It is determined that the wearing position data is first wearing position data in a case that the speed component points to the third side edge 203. The first wearing position data indicates that the electronic device is worn on the left part of body of the wearer. It is determined that the wearing position data is second wearing position data in a case that the speed component points to the fourth side edge 204. The second wearing position data indicates that the electronic device is worn on the right part of body of the wearer.

The meaning of the relative ascent direction is the same as that described above, which is not described herein. For example, the electronic device is a smart watch. In a case that the smart watch is worn on the left hand of the user, the smart watch is moved towards right (the third side edge 203) in the plane perpendicular to the relative ascent direction besides being moved in the relative ascent direction when the user raises the left hand to watch the watch. Similarly, in a case that the smart watch is worn on the right hand of the user, the smart watch is moved towards left (the fourth side edge 204) in the plane perpendicular to the relative ascent direction when the user raises the right hand to watch the watch.

Therefore, the direction of the speed component of the electronic device in the plane perpendicular to the relative ascent direction in the relative ascent process of the electronic device may be detected by the first sensing unit. In a case that the speed component is in a plane where a display surface of the display unit of the electronic device is located, the speed component points to a side edge of the functional main body. In a case that the speed component points to the third side edge, it is indicated that the electronic device is worn on the left part of body of the wearer, which corresponds to the first wearing position data. In a case that the speed component points to the fourth side edge, it is indicated that the electronic device is worn on the right part of body of the wearer, which corresponds to the second wearing position data.

Optionally, the speed component mentioned in the above technical solution refers to the speed component with the maximum absolute value in the plane perpendicular to the relative ascent direction. For example, the electronic device is worn on the left hand of the user, the electronic device has a displacement towards the right side of body of the user and a displacement towards the user from the front side of body in a plane perpendicular to the gravity direction (i.e., the horizontal plane) when the user raises the left hand to watch the display unit of the electronic device. The displacement towards the right side of body of the user is large and the displacement towards the user form the front side of body is small, therefore the speed component with the maximum absolute value is the speed component towards the right side of body of the user.

Optionally, in conjunction with the above two ways of the first possible implementation of the information processing method, after the current wearing position data of the electronic device is determined, there are several cases for controlling the electronic device to operate in a working mode matching with the current wearing position data.

In the first case, if the current wearing position data is the first wearing position data, i.e., the electronic device is worn on the left part of body, the display object is displayed on the region of the display unit of the electronic device close to the third side edge 203, since the right region of the display unit (the region close to the third side edge 203) is not likely to be sheltered by clothes and is convenient for the user to watch, and in addition this region is convenient for the user to perform an input operation with the right hand. If the operation is performed on the left region of the display unit, the right hand of the user needs to move a longer distance, which does not conform to the operation habit of the user. Similarly, if the wearing position data is the second wearing position data, the display object is displayed on the region of the display unit of the electronic device close to the fourth side edge 204.

Figure 3A:
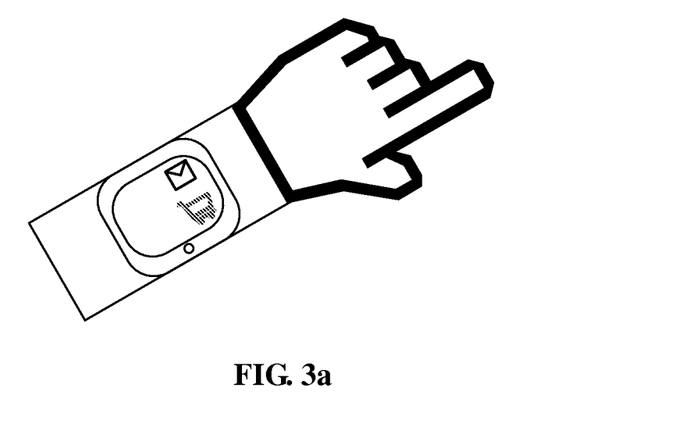
FIG. 3a is a schematic diagram of a display mode when the electronic device is worn on the left part of body.
Figure 3B:
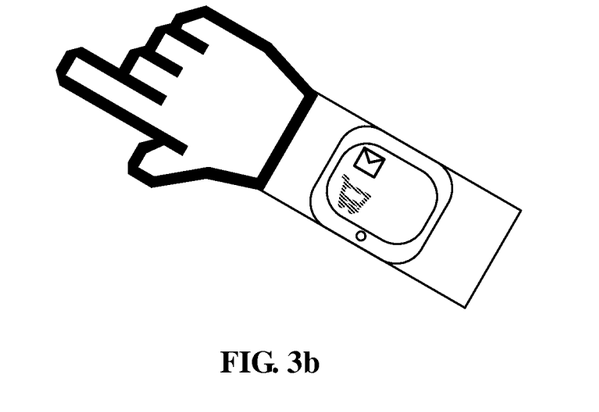
FIG. 3b is a schematic diagram of a display mode when the electronic device is worn on the right part of body.

Therefore, referring to FIG. 3a, in a case that it is determined that the wearing position data is the first wearing position data, the electronic device is controlled to move the display position of the display object towards the third side edge 203; and referring to FIG. 3b, in a case that it is determined that the wearing position data is the second wearing position data, the electronic device is controlled to move the display position of the display object towards the fourth side edge 204. In a case that multiple display objects are displayed on the display unit and it is determined that the wearing position data is the first wearing position data, all of the display objects may be controlled to move towards the third side edge 203 or only the display object relatively far away from the third side edge 203 may be controlled to move towards the third side edge 203. In a case that it is determined the wearing position data is the second wearing position data, the operation is similar as the above.

In the second case, the touch control device on the third side edge 203 is controlled to be in an enabled state in a case that it is determined that the wearing position data is the first wearing position data; and/or the touch control device on the fourth side edge 204 is controlled to be in an enabled state in a case that it is determined that the wearing position data is the second wearing position data.

Both the third side edge 203 and the fourth side edge 204 are provided with a touch control device. In a case that the wearing position data is the first wearing position data, i.e., the electronic device is worn on the left part of body, the touch control device on the third side edge (the right side) is not likely to be sheltered by clothes, and the right hand of the user moves a short distance when the user operates the touch control device on the third side edge 203, hence it is more convenient for the user to operate; therefore, the touch control device on the third side edge 203 is controlled to be enabled to respond to the input operation of the user, and the touch control device on the fourth side edge 204 is controlled to be disabled to not respond to the input operation of the user, thereby avoiding an error response due to a friction between the touch control device on the fourth side edge 204 and the clothes. Similarly, in a case that the wearing position data is the second wearing position data, the touch control device on the fourth side edge 204 is controlled to be enabled to respond to the input operation of the user, and the touch control device on the third side edge 203 is controlled to be disabled to not respond to the input operation of the user.

In the third case, the electronic device is controlled to take a first touch operation of the user as a first preset input operation in a case that it is determined that the wearing position data is the first wearing position data, where the first touch operation is a touch operation performed on a touch region of the electronic device and towards the fourth side edge 204; and/or the electronic device is controlled to take a second touch operation of the user as the first preset input operation in a case that it is determined that the wearing position data is the second wearing position data, where the second touch operation is a touch operation performed on the touch region and towards the third side edge 203.

In a case that the wearing position data is the first wearing position data, i.e., the electronic device is worn on the left part of body, a touch operation of sliding from left to right on the display unit with a finger or a stylus may be not started from the leftmost side of the screen but may be started from certain position of the middle of the screen since the left region of the display unit of the electronic device may be sheltered by clothes, therefore the display object on the screen may be sheltered by the finger or the stylus, and the touch operation may be performed on an error display object since some display object are sheltered. To avoid the above situation, in the embodiment of the application, in a case that the electronic device is worn on the left part of body, the direction of the touch operation with high using frequency is set to be a direction from the right side of the display unit to the left side of the display unit, i.e., the sliding direction is a direction from the third side edge 203 to the fourth side edge 204. Similarly, in a case that the wearing position data is the second wearing position data, i.e., the electronic device is worn on the right part of body, the direction of the touch operation with high using frequency is set to be a direction from the left side of the display unit to the right side of the display unit, i.e., the sliding direction is a direction from the fourth side edge 204 to the third side edge 203.

Practically, from the perspective of a habitual sliding direction of the finger for performing the touch operation, the above technical solution may be improved as follows. The electronic device is controlled to take the first touch operation of the user as the first preset input operation in a case that it is determined that the wearing position data is the first wearing position data, where the first touch operation is a touch operation performed on the touch region of the electronic device and towards the third side edge 203; and/or the electronic device is controlled to take the second touch operation of the user as the first preset input operation in a case that it is determined that the wearing position data is the second wearing position data, where the second touch operation is a touch operation performed on the touch region and towards the fourth side edge 204.

In a case that the wearing position data is the first wearing position data, i.e., the electronic device is worn on the left part of body, the user operates the electronic device with the right hand and the right hand habitually slides right, hence a direction of a gesture which is convenient for the user to operate the electronic device may be set as a direction towards right (the third side edge 203). Similarly, in a case that the wearing position data is the second wearing position data, i.e., the electronic device is worn on the right part of body, the direction of the gesture which is convenient for the user to operate the electronic device may be set as a direction towards left (the fourth side edge 204). For example, the electronic device is a smart watch and the display unit is a touch control display unit. In a case that the smart watch is worn on the left hand, a gesture operation of moving a display object towards right and to the right edge of the display unit (the side close to the third side edge 203) by the user is defined as an operation of deleting the display object from the current display interface. In a case that the smart watch is worn on the right hand, a gesture operation of moving a display object towards left and to the left edge of the display unit (the side close to the fourth side edge 204) by the user is defined as an operation of deleting the display object from the current display interface.

By the adjustment to the working mode of the electronic device in the above three cases, the user views the display object displayed on the display unit of the electronic device more conveniently, and the user performs the input operation more conveniently.

Optionally, in a second possible implementation of the embodiment of the application, the electronic device detects a connection state parameter indicating a connection state between the functional main body and the fixing element of the electronic device by a second sensing unit, where the connection state parameter is the characteristic parameter.

The connection state parameter may be a status bit indicating connection between the fixing element and the functional main body. Different status bits represent different connection relations between the fixing element and the functional main body, and different connection relations between the fixing element and the functional main body indicate that the electronic device is worn on different parts of body of the user (the wearer). For example, if the fixing element and the functional main body are in a first connection relation, the characteristic parameter (the status bit) is 1, and the electronic device is worn on the left hand of the user; and if the fixing element and the functional main body are in a second connection relation, the characteristic parameter (the status bit) is 0, and the electronic device is worn on the right hand of the user. In this case, the sensing unit is a sensing device detecting whether the status bit indicating connection between the fixing element and the functional main body is 0 or 1, and the wearing position of the electronic device can be determined based on the status bit detected by the sensing unit.

Figure 4A:
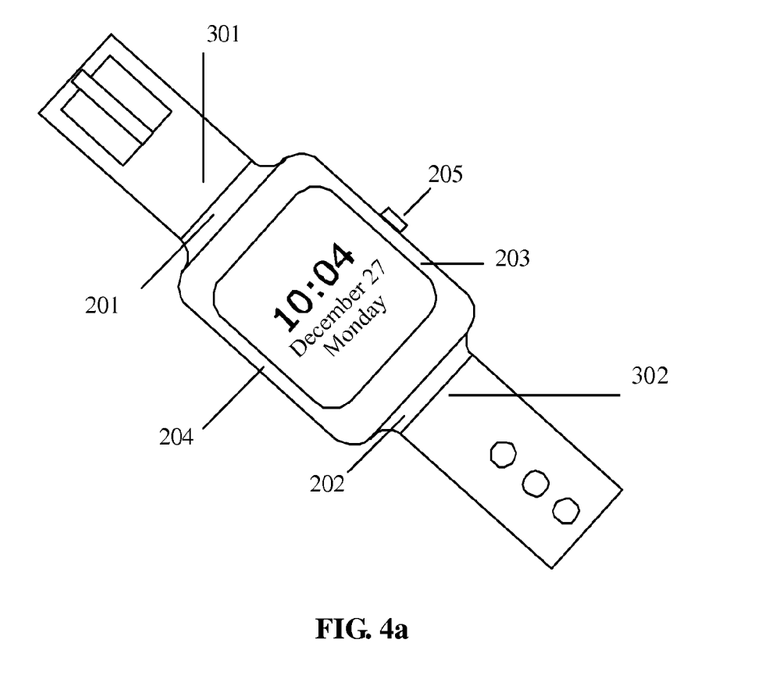
FIG. 4a is a schematic diagram of a connection between a functional main body and a fixing element when an electronic device is worn on the left part of body.

Optionally, referring to FIG. 4a, the functional main body includes a first side edge 201 and a second side edge 202 which are opposite to each other and a third side edge 203 and a fourth side edge 204 which are opposite to each other. The first side edge 201, the third side edge 203, the second side edge 202 and the fourth side edge 204 are connected in turn and end-to-end. The first side edge 201 and the second side edge 202 correspond to the fixing element, and the third side edge 203 is provided with a first input device 205.

In a case that the first side edge 201 is connected to a first end 301 of the fixing element, a first connection state parameter is detected by the second sensing unit. In a case that the first side edge 201 is connected to a second end 302 of the fixing element, a second connection state parameter is detected by the second sensing unit. The first end 301 and the second end 302 are two ends of the fixing element which are opposite to each other when the fixing element is in a fixed state.

It is determined that the wearing position data is third wearing position data based on the first connection state parameter, and the third wearing position data indicates that the electronic device is worn on the left part of body of the wearer. It is determined that the wearing position data is fourth wearing position data based on the second connection state parameter, and the fourth wearing position data indicates that the electronic device is worn on the right part of body of the wearer.

The meanings of the first side edge 201, the second side edge 202 and the fixing element are the same as those in the above embodiments, which are not described herein. The first input device 205 is a device with which the user can quickly set or operate the electronic device. For example, in a case that the electronic device is a smart watch, the first input device 205 may be a knob at the right side of the smart watch for quickly setting time, or a shooting functional button for quickly starting a camera for shoot.

In a case that the electronic device is worn on the left part of body of the user, the user operates the electronic device using the right hand. In order to facilitating the user to operate the first input device 205, the electronic device is worn on the user such that the third side edge 203 provided with the first input device 205 is towards outside of the body. Similarly, in a case that the electronic device is worn on the right part of body of the user, the electronic device is worn on the user such that the third side edge 203 provided with the first input device 205 is towards outside of the body.

Practically, the fixing element for fixing the electronic device is generally a fixing buckle, such as a pin buckle, a fold-over buckle or a butterfly buckle. These fixing buckles have an orientation, that is, in a case that the electronic device is worn on the left hand of the user and the third side edge 203 is towards outside of the body without changing the connection relation between the fixing element and the functional main body, the orientation of the fixing buckle conforms to the ergonomics and the user can wear or take off the electronic device easily. However, in a case that the electronic device is worn on the right hand of the user and the third side edge 203 is also towards outside of the body, the orientation of the fixing buckle does not conform to the ergonomics and it is difficult for the user to wear or take off the electronic device.

Figure 4B:
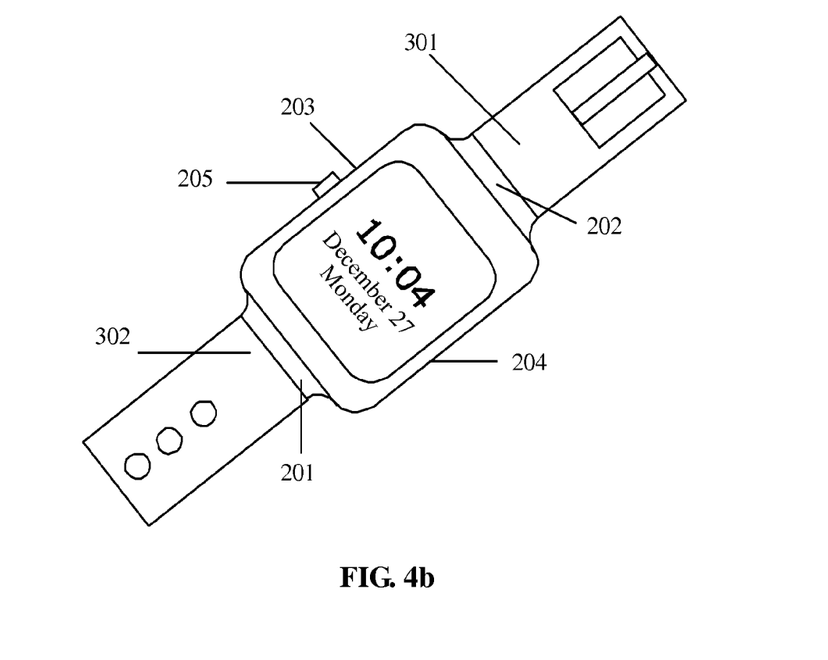
FIG. 4b is a schematic diagram of a connection between a functional main body and a fixing element when an electronic device is worn on the right part of body.

In order to facilitate the user to operate the first input device 205 and to wear the electronic device, in the embodiment of the application, the connection relation between the functional main body and the fixing element of the electronic device may be changed. Specifically, the first connection relation is that: the first side edge 201 of the functional main body is connected to the first end 301 of the fixing element, and the second side edge 202 of the functional main body is connected to the second end 302 of the fixing element. The second connection relation is that: the first side edge 201 of the functional main body is connected to the second end 302 of the fixing element, and the second side edge 202 of the functional main body is connected to the first end 301 of the fixing element. The first end 301 and the second end 302 are two ends of the fixing element which are opposite to each other when the fixing element is in a fixed state. For example, in a case that the fixing buckle is a pin buckle, the fixing element includes two parts, and the first end 301 and the second end 302 are ends of the two parts respectively connected to the functional main body. In a case that the fixing buckle is a fold-over buckle, the fixing element presents a successive strip structure, and the first end 301 and the second end 302 are two ends of the fixing element which are connected to the functional main body.

The user may wear the electronic device on the left hand using the first connection relation, such that the third side edge 203 where the first input device 205 is located is towards outside of the body and the user can wear or take off the electronic device conveniently. The user may wear the electronic device on the right hand using the second connecting relation, such that the third side edge 203 where the first input device 205 is located is also towards outside of the body and the user can wear or take off the electronic device conveniently.

Therefore, the wearing position of the electronic device can be determined based on the connection state parameter indicating a connection state between the functional main body and the fixing element detected by the second sensing unit. The second sensing unit may be implemented by referring to the way for detecting connection relation between two devices. For example, the second sensing unit is a voltage detecting device, and the first side edge 201 is provided with a switch; the switch is turned on if the first side edge 201 is connected to the first end 301 and the switch is turned off if the first side edge 201 is connected to the second end 302. The voltage value detected by the voltage detecting device when the switch is turned on is different from the voltage value detected by the voltage detecting device when the switch is turned off. Therefore, the voltage signal detected by the voltage detecting device may be take as the connection state parameter indicating connection relation between the fixing element and the functional main body.

Optionally, in conjunction with the second possible implementation of the information processing method, after the wearing position data of the electronic device is determined, i.e., the wearing position of the electronic device is determined, there is also the following case for controlling the electronic device to operate in a working mode matching with the wearing position data, referring to FIG. 4a and FIG. 4b.

The electronic device is controlled to take a direction from the first side edge 201 to the second side edge 202 as a forward display direction of the display unit of the electronic device in a case that the wearing position data is third wearing position data; and/or the electronic device is controlled to take a direction from the second side edge 202 to the first side edge 201 as the forward display direction of the display unit of the electronic device in a case that the wearing position data is fourth wearing position data.

The forward display direction is a direction from the upper side of the display object to the lower side of the display object when the display unit displays the display object. In a case that the wearing position data is the third wearing position data, it is determined that the electronic device is worn on the left part of body of the user, and the forward display direction is set as the direction from the first side edge 201 to the second side edge 202, i.e., the side of the display unit close to the first side edge 201 is used as a top (upper) side of the display region and the side of the display unit close to the second side edge 202 is used as the bottom (lower) side of the display region. Therefore, the user can view the display object displayed in the forward display direction. In a case that the wearing position data is fourth wearing position data, it is determined that the electronic device is worn on the right part of body of the user, and the forward display direction is set as the direction from the second side edge 202 to the first side edge 201, i.e., the side of the display unit close to the second side edge 202 is used as the top (upper) side of the display region and the side of the display unit close to the first side edge 201 is used as the bottom (lower) side of the display region. Therefore, the user can view the display object displayed in the forward display direction.

For example, the electronic device is a smart watch, and the fixing element is a pin buckle. The fixing element includes two independent parts, one of which includes a jack and the other one of which includes a pin. In the relevant technology, the part including the jack is connected to the side edge of the smart watch corresponding to 6 o'clock, and the part including the pin is connected to the side edge of the smart watch corresponding to 12 o'clock. In a case that the smart watch is worn on the right hand of the user and the side edge of the smart watch corresponding to 3 o'clock is towards the left part of body, it is difficult to wear or take off the smart watch due to orientation in connecting the jacket and the pin if the connection relation between the part including the jack and the functional main body and the connection relation between the part including the pin and the functional main body are unchanged.

In view of the above problem, in the second possible implementation of the information processing method of the embodiment of the application, in a case that the smart watch is worn on the right hand of the user and the right side of the watch (the side of the watch corresponding to 3 o'clock in a case that the display direction of the watch is not adjusted) is required to be towards the left part of body, the user may change the connection relation between the part of the fixing element including the jack, the part of the fixing element including the pin and the functional main body, to make the part of the fixing element including the pin previously connected to the upper side of the watch (the side of the watch corresponding to 12 o'clock in a case that the display direction of the watch is not adjusted) be connected to the lower side of the functional main body (the side of the watch corresponding to 6 o'clock in a case that the display direction of the watch is not adjusted), and to make the part of the fixing element including the jack be connected to the upper side of the functional main body, and it is automatically identified that the electronic device is worn on the right part of body after the connection relation is changed. That is, in the second possible implementation of the information processing method of the embodiment of the application, the electronic device identifies which one of the first side edge 201 and the second side edge 202 is connected to the part of the fixing element including the pin, and determines the side edge connected to the part including the pin as the upper side of the display unit for displaying. For example, when the display unit displays a watch dial, the side edge connected to the part including the pin corresponds to 12 o'clock, and the side edge connected to the part including the jack corresponds to 6 o'clock.

In the first possible implementation of the information processing method of the embodiment of the application and the relevant technology, the sensing device for sensing spatial data such as movement direction and spatial displacement of the electronic device is required. However, in the second possible implementation of the information processing method of the embodiment of the application, the device such as an acceleration sensor and a gravity sensor is not required, and the wearing position of the electronic device can be determined only by detecting which one of the first side edge 201 and the second side edge 202 of the electronic device is connected to a specific end of the fixing element. Therefore, in the second possible implementation of the information processing method, the cost is low, the computation amount is small, and the power consumption is low.

In addition, in the second possible implementation of the information processing method, the electronic device may be controlled to display the display object in a display region close to the third side edge 203, which facilitates the user to view the display object and operate the display object in the display region close to the third side edge 203.

Second Embodiment

Based on the same concept as above, an electronic device is provided in the second embodiment of the application. Referring to FIG. 2 again, the electronic device includes a functional main body 200 and a fixing element 300. The fixing element 300 has at least a fixed state in which the fixing element forms at least a portion of an annulus. The functional main body 200 is capable of maintaining a connection with the fixing element 300 and is capable of being fixed around at least a part of body of a wearer by the fixing element 300.

Figure 5:
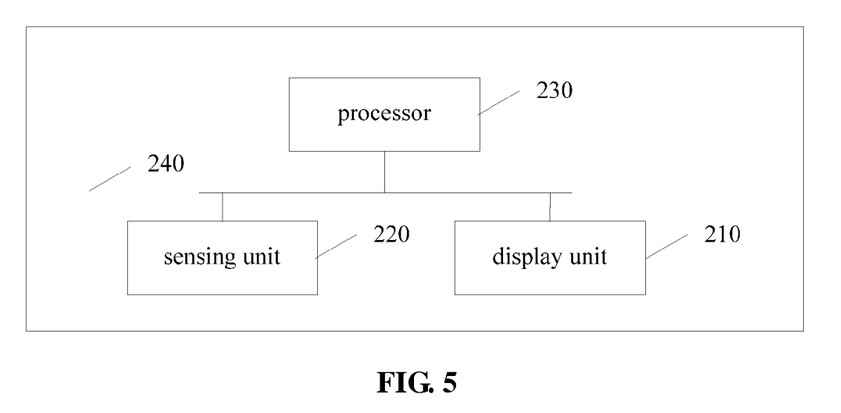
FIG. 5 is a schematic structural block diagram of an electronic device according to a second embodiment of the application.

Referring to FIG. 5, the functional main body 200 includes a display unit 210, a sensing unit 220 and a processor 230.

The display unit 210 is located on a first surface of the functional main body.

The sensing unit 220 is configured to detect a characteristic parameter of the electronic device.

The processor 230 is connected to the display unit and the sensing unit. The processor 230 is configured to determine wearing position data of the electronic device based on the characteristic parameter and control the electronic device to operate in a working mode matching with the wearing position data, where the wearing position data indicates a positional relation between the electronic device and the wearer when a fixed relation between the electronic device and the at least a part of body of the wearer is maintained by the fixing element of the electronic device.

The display unit 210, the sensing unit 220 and the processor 230 may be directly or indirectly fixed on a frame structure of the functional main body. Alternatively, the display unit 210 and the sensing unit 220 may be directly or indirectly fixed on a circuit board of the processor 230. The display unit 210 and the sensing unit 220 are connected to the processor 230. Optionally, the display unit 210, the sensing unit 220 and the processor 230 are connected to a bus 240.

The electronic device in the second embodiment and the information processing method in the first embodiment are two aspects of the same inventive concept. Since the implementations of the method are described in detail above, those skilled in the art can clearly know the structures or the implementations of the electronic device in the embodiment, which are not described herein for the conciseness of the specification.

In the electronic device provided by the embodiment of the application, the current wearing position data of the electronic device can be determined based on the characteristic parameter detected by the sensing unit, i.e., the wearing position of the electronic device is determined; and the electronic device is controlled to operate in a working mode matching with the wearing position data. In this working mode, the user can use the electronic device in a habitual interaction mode for the current wearing position. Therefore, user experience of the electronic device is improved and efficiency for processing task of the electronic device by the user is also improved.

Figure 6:
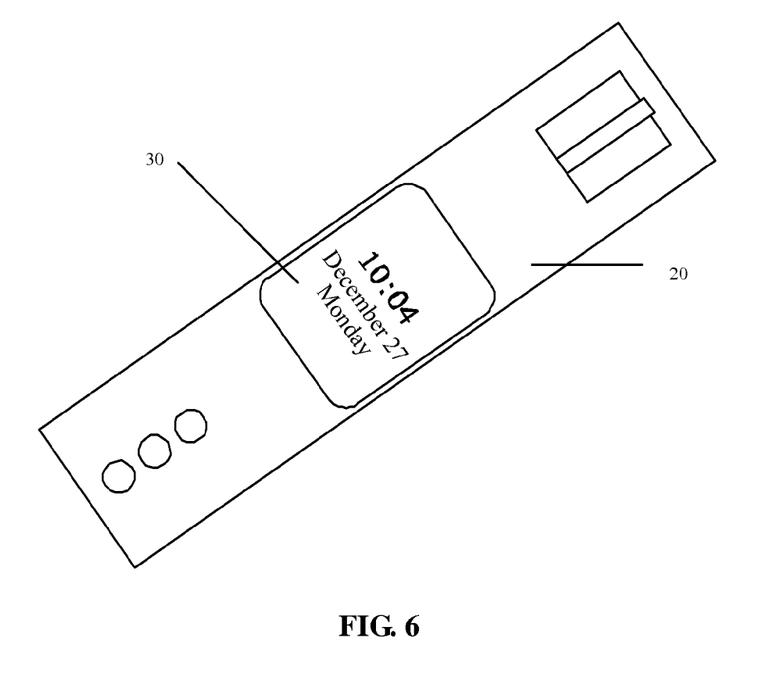
FIG. 6 is a schematic diagram of a connection between a functional main body and a fixing element of an electronic device.

Optionally, the connection relation between the functional main body 200 and the fixing element may be maintained by the following two ways. In the first way, referring to FIG. 4a, two ends of the fixing element are respectively connected to two side edges of the functional main body, as the second possible implementation of the information processing method of the first embodiment. In the second way, referring to FIG. 6, the functional main body 200 is adhered on a surface of the fixing element 300 or fixed within a concave structure provided on a surface of the fixing element 300. The functional main body may be fixed by means of fastening, embedding, adhering or bolting.

Figure 7:
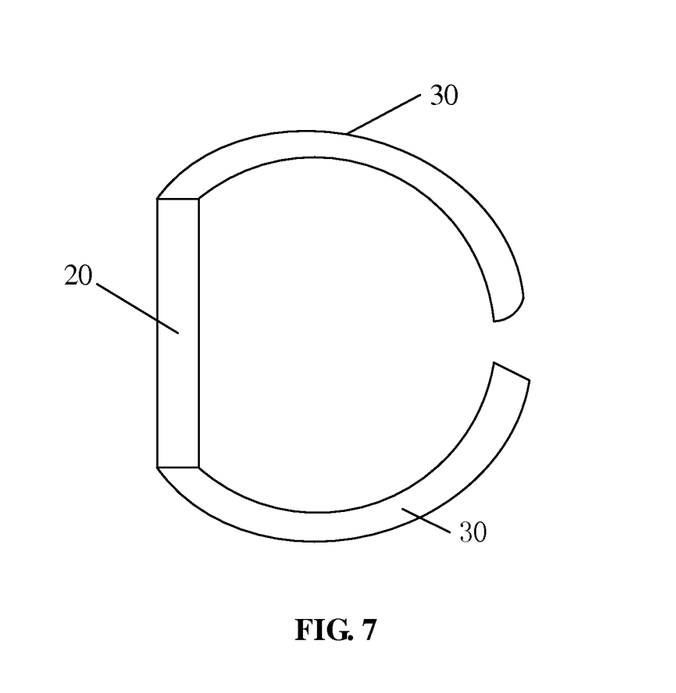
FIG. 7 is a schematic side view of an electronic device according to an embodiment.

Optionally, referring to FIG. 7, in a case that the fixing element presents a partial annular structure with an opening, the opening should not be too narrow but should be narrower than the part of body of the user on which the electronic device is worn. For example, in a case that the electronic device is worn on the arm of the user, the width of the opening should be less than the width of the arm (i.e., thickness of the arm), to avoid that the electronic device falls off from the arm.

Optionally, in a case the fixing element is in a fixed state, the maximum width of the fixing element presenting an annular structure (including a partial annular shape with an opening) should be greater than the width of the part of body of the user on which the electronic device is worn. The maximum width of the fixing element refers to the maximum distance between two points on the fixing element in the annular cross section of the fixing element. For example, in a case that the electronic device is worn on the arm of the user and the fixing element presents a regular annular structure, the diameter of the annular structure is greater than or equal to the width of the arm, and in this way the fixing element can surround the arm.

Optionally, the processor is configured to: control the electronic device to display a display object in a display mode matching with the wearing position data; and/or control the electronic device to respond to an input operation of the user in a response mode matching with the wearing position data.

Optionally, the sensing unit includes a first sensing unit. The first sensing unit is configured to detect spatial data of the electronic device, where the spatial data is the characteristic parameter.

Optionally, the functional main body includes a first side edge 201 and a second side edge 202 which are opposite to each other and a third side edge 203 and a fourth side edge 204 which are opposite to each other. The first side edge 201, the third side edge 203, the second side edge 202 and the fourth side edge 204 are connected in turn and end-to-end. The first side edge 201 and the second side edge 202 correspond to the fixing element.

The first sensing unit is configured to detect, during a relative ascent process of the electronic device, position varying data of the third side edge 203 and the fourth side edge 204 in a relative ascent direction of the electronic device.

The processor is configured to: determine that the wearing position data is first wearing position data in a case that the position varying data indicates that position variation of the third side edge 203 in the relative ascent direction is greater than position variation of the fourth side edge 204 in the relative ascent direction, where the first wearing position data indicates that the electronic device is worn on the left part of body of the wearer; and/or determine that the wearing position data is second wearing position data in a case that the position varying data indicates that position variation of the fourth side edge 204 in the relative ascent direction is greater than position variation of the third side edge 203 in the relative ascent direction, where the second wearing position data indicates that the electronic device is worn on the right part of body of the wearer.

Optionally, the functional main body of the electronic device includes a first side edge 201 and a second side edge 202 which are opposite to each other and a third side edge 203 and a fourth side edge 204 which are opposite to each other. The first side edge 201, the third side edge 203, the second side edge 202 and the fourth side edge 204 are connected in turn and end-to-end. The first side edge 201 and the second side edge 202 correspond to the fixing element.

The first sensing unit is configured to detect, during a relative ascent process of the electronic device, a direction of a speed component of the electronic device in a plane perpendicular to a relative ascent direction of the electronic device.

The processor is configured to: determine the side edge that the speed component points to in a case that the speed component is in a plane where a display surface of a display unit of the electronic device is located; determine that the wearing position data is the first wearing position data in a case that the speed component points to the third side edge 203, where the first wearing position data indicates that the electronic device is worn on the left part of body of the wearer; and determine that the wearing position data is the second wearing position data in a case that the speed component points to the fourth side edge 204, where the second wearing position data indicates that the electronic device is worn on the right part of body of the wearer.

Optionally, the third side edge 203 is located on the right side of a forward display direction of the display unit, and the fourth side edge 204 is located on the left side of the forward display direction of the display unit.

The processor is configured to: control the electronic device to move a display position of a display object towards the third side edge 203 in a case that it is determined that the wearing position data is the first wearing position data; and/or control the electronic device to move the display position of the display object towards the fourth side edge 204 in a case that it is determined that the wearing position data is the second wearing position data.

Optionally, the third side edge 203 is located on the right side of a forward display direction of the display unit, and the fourth side edge 204 is located on the left side of the forward display direction of the display unit.

The functional main body further includes touch control devices respectively arranged on the third side edge 203 and the fourth side edge 204.

The processor is configured to: control the touch control device on the third side edge 203 to be in an enabled state in a case that it is determined that the wearing position data is the first wearing position data; and/or control the touch control device on the fourth side edge 204 to be in an enabled state in a case that it is determined that the wearing position data is the second wearing position data.

Optionally, the third side edge 203 is located on the right side of a forward display direction of the display unit, and the fourth side edge 204 is located on the left side of the forward display direction of the display unit.

The display unit is a touch control display unit.

The processor is configured to: control the electronic device to take a first touch operation of the user as a first preset input operation in a case that it is determined that the wearing position data is the first wearing position data, where the first touch operation is a touch operation performed on the touch control display unit and towards the fourth side edge 204; and/or control the electronic device to take a second touch operation of the user as the first preset input operation in a case that it is determined that the wearing position data is the second wearing position data, where the second touch operation is a touch operation performed on the touch control display unit and towards the third side edge 203.

Optionally, the sensing unit includes a second sensing unit. The second sensing unit is configured to detect a connection state parameter indicating a connection state between the functional main body and the fixing element of the electronic device, where the connection state parameter is the characteristic parameter.

Optionally, the functional main body includes a first side edge 201 and a second side edge 202 which are opposite to each other and a third side edge 203 and a fourth side edge 204 which are opposite to each other. The first side edge 201, the third side edge 203, the second side edge 202 and the fourth side edge 204 are connected in turn and end-to-end. The first side edge 201 and the second side edge 202 correspond to the fixing element.

The functional main body further includes a first input device 205 arranged on the third side edge 203.

The fixing element includes a first end 301 and a second end 302, where the first end 301 and the second end 302 are two ends of the fixing element which are opposite to each other when the fixing element is in a fixed state.

The second sensing unit is configured to: detect a first connection state parameter in a case that the first side edge 201 is connected to the first end 301 of the fixing element; and/or detect a second connection state parameter in a case that the first side edge 201 is connected to the second end 302 of the fixing element.

The processor is configured to: determine that the wearing position data is third wearing position data based on the first connection state parameter, where the third wearing position data indicates that the electronic device is worn on the left part of body of the wearer; and/or determine that the wearing position data is fourth wearing position data based on the second connection state parameter, where the fourth wearing position data indicates that the electronic device is worn on the right part of body of the wearer.

Optionally, the processor is configured to: control the electronic device to take a direction from the first side edge 201 to the second side edge 202 as a forward display direction of a display unit of the electronic device in a case that it is determined that the wearing position data is the third wearing position data; and/or control the electronic device to take a direction from the second side edge 202 to the first side edge 201 as a forward display direction of a display unit of the electronic device in a case that it is determined that the wearing position data is the fourth wearing position data.

Optionally, the electronic device further includes a storage unit for storing instructions. The processor controls the electronic device to process tasks by executing the instructions stored in the storage unit.

Optionally, the electronic device further includes a random access storage unit and a read only storage unit. A basic input/output system solidified in the read only storage unit is used to guide the system of the electronic device to start and to be in a normal operating state. After the electronic device is in the normal operating state, an application program and an operating system are run via the random access storage unit, and the processor controls the electronic device to process tasks by executing instructions in the random access storage unit.

In the electronic device provided by the embodiment of the application, current wearing position data of the electronic device is determined based on the characteristic parameter detected by the sensing unit, i.e., the wearing position of the electronic device is determined; and the electronic device is controlled to operate in a working mode matching with the wearing position data. In this working mode, the user can use the electronic device in a habitual interaction mode for the current wearing position. Therefore, user experience of the electronic device is improved and efficiency for processing task of the electronic device by the user is also improved.

Those skilled in the art should understand that, the embodiments of the application may be implemented as a method, a system or a computer program product. Hence, the disclosure may be implemented by an only hardware embodiment, an only software embodiment or a combination of a software embodiment and a hardware embodiment. In addition, the disclosure may be embodied as a computer program product implemented on one or more computer available storage mediums storing computer available program code (including but not being limited to a disc storage, a CD-ROM or an optical storage).

The disclosure is described by referring to the flowcharts and/or block diagrams according to the method, the device (system) and the computer program product of the embodiments of the application. It should be understood that, each flow of the flowcharts and/or each block of the block diagrams and/or a combination of flow and/or block of the flowcharts and/or block diagrams may be implemented by computer program instructions. These computer program instructions may be provided to a general-purpose computer, a dedicated computer, an embedded processor or processors of other programmable data processing devices to generate a machine, such that the instructions executed by the computer or processors of other programmable data processing devices generate an apparatus for implementing the function specified in one or more flows of the flowcharts and/or one or more blocks of the block diagrams.

These computer program instructions may be also stored in a computer readable storage which can guide the computer or other programmable data processing devices to operate in a certain mode, such that the instructions stored in the computer readable memory generate an article including an instruction apparatus, which can implement the functions specified in one or more flows of the flowcharts and/or one or more blocks of the block diagrams.

Specifically, the computer program instructions corresponding to the information processing method of the embodiment of the application may be stored in a storage medium such as an optical disc, a hard disc or a USB flash disc. The computer program instructions stored in the storage medium corresponding to the information processing method, when being read or executed, include steps of: detecting a characteristic parameter of an electronic device by a sensing unit of the electronic device; determining wearing position data of the electronic device based on the characteristic parameter, where the wearing position data indicates a positional relation between the electronic device and a wearer when a fixed relation between the electronic device and at least a part of body of the wearer is maintained by a fixing element of the electronic device; and controlling the electronic device to operate in a working mode matching with the wearing position data.

Optionally, the computer program instructions stored in the storage medium corresponding to the step of controlling the electronic device to operate in a working mode matching with the wearing position data, when being executed, include a step of: controlling the electronic device to display a display object in a display mode matching with the wearing position data; and/or controlling the electronic device to respond to an input operation of a user in a response mode matching with the wearing position data.

Optionally, the computer program instructions stored in the storage medium corresponding to the step of detecting a characteristic parameter of an electronic device by a sensing unit of the electronic device, when being executed, include a step of: detecting spatial data of the electronic device by a first sensing unit of the electronic device, where the spatial data is the characteristic parameter.

Optionally, the computer program instructions stored in the storage medium corresponding to the step of detecting spatial data of the electronic device by a first sensing unit of the electronic device, when being executed, include a step of: detecting, during a relative ascent process of the electronic device, position varying data of the third side edge and the fourth side edge in a relative ascent direction of the electronic device by the first sensing unit; and the computer program instructions stored in the storage medium corresponding to the step of determining wearing position data of the electronic device based on the characteristic parameter, when being executed, include a step of: determining that the wearing position data is first wearing position data in a case that the position varying data indicates that position variation of the third side edge in a relative ascent direction of the electronic device is greater than position variation of the fourth side edge in the relative ascent direction of the electronic device, where the first wearing position data indicates that the electronic device is worn on a left part of body of the wearer; and/or determining that the wearing position data is second wearing position data in a case that the position varying data indicates that positional variation of the fourth side edge in the relative ascent direction of the electronic device is greater than position variation of the third side edge in the relative ascent direction of the electronic device, where the second wearing position data indicates that the electronic device is worn on a right part of body of the wearer.

Optionally, the computer program instructions stored in the storage medium corresponding to the step of detecting spatial data of the electronic device by a first sensing unit of the electronic device, when being executed, include a step of: detecting, during a relative ascent process of the electronic device, a direction of a speed component of the electronic device in a plane perpendicular to a relative ascent direction of the electronic device by the first sensing unit; and the computer program instructions stored in the storage medium corresponding to the step of determining wearing position data of the electronic device based on the characteristic parameter, when being executed, include steps of: determining the side edge that the speed component points to in a case that the speed component is in a plane where a display surface of a display unit of the electronic device is located; determining that the wearing position data is first wearing position data in a case that the speed component points to the third side edge, where the first wearing position data indicates that the electronic device is worn on a left part of body of the wearer, and/or determining that the wearing position data is second wearing position data in a case that the speed component points to the fourth side edge, where the second wearing position data indicates that the electronic device is worn on a right part of body of the wearer.

Optionally, the computer program instructions stored in the storage medium corresponding to the step of controlling the electronic device to operate in a working mode matching with the wearing position data, when being executed, include a step of: controlling the electronic device to move a display position of a display object towards the third side edge in a case that it is determined that the wearing position data is the first wearing position data; and/or controlling the electronic device to move the display position of the display object towards the fourth side edge in a case that it is determined that the wearing position data is the second wearing position data; and/or controlling, if a touch control device is arranged on the third side edge, the touch control device on the third side edge to be in an enabled state in a case that it is determined that the wearing position data is the first wearing position data; and/or controlling, if a touch control device is arranged on the fourth side edge, the touch control device on the fourth side edge to be in an enabled state in a case that it is determined that the wearing position data is the second wearing position data; and/or controlling the electronic device to take a first touch operation of a user as a first preset input operation in a case that it is determined that the wearing position data is the first wearing position data, where the first touch operation is a touch operation performed on a touch region of the electronic device and towards the fourth side edge; and/or controlling the electronic device to take a second touch operation of the user as the first preset input operation in a case that it is determined that the wearing position data is the second wearing position data, where the second touch operation is a touch operation performed on the touch region and towards the third side edge.

Optionally, the computer program instructions stored in the storage medium corresponding to the step of detecting a characteristic parameter of an electronic device by a sensing unit of the electronic device, when being executed, include a step of: detecting a connection state parameter indicating a connection state between a functional main body and the fixing element of the electronic device by a second sensing unit of the electronic device, where the connection state parameter is the characteristic parameter.

Optionally, the computer program instructions stored in the storage medium corresponding to the step of detecting a connection state parameter indicating a connection state between a functional main body and the fixing element of the electronic device by a second sensing unit of the electronic device, when being executed, include a step of: detecting a first connection state parameter by the second sensing unit in a case that the first side edge is connected to a first end of the fixing element; and/or detecting a second connection state parameter by the second sensing unit in a case that the first side edge is connected to a second end of the fixing element, where the first end and the second end are two ends of the fixing element when the fixing element is in a fixed state; and the computer program instructions stored in the storage medium corresponding to the step of determining wearing position data of the electronic device based on the characteristic parameter, when being executed, include a step of: determining that the wearing position data is third wearing position data based on the first connection state parameter, where the third wearing position data indicates that the electronic device is worn on a left part of body of the wearer; and/or determining that the wearing position data is fourth wearing position data based on the second connection state parameter, where the fourth wearing position data indicates that the electronic device is worn on a right part of body of the wearer.

Optionally, the computer program instructions stored in the storage medium corresponding to the step of controlling the electronic device to operate in a working mode matching with the wearing position data, when being executed, include a step of: controlling the electronic device to take a direction from the first side edge to the second side edge as a forward display direction of the display unit of the electronic device in a case that the wearing position data is the third wearing position data; and/or controlling the electronic device to take a direction from the second side edge to the first side edge as the forward display direction of the display unit of the electronic device in a case that the wearing position data is the fourth wearing position data.

Although embodiments of the application have been described, those skilled in the art can make other alterations and changes to these embodiments based on the basic creative concept. Hence, the appended claims are intended to include the embodiments and all of the alterations and changes falling within the scope of the application.

Apparently, those skilled in the art can make various changes and variations to the disclosure without departing from the spirit and scope of the application. In this way, the application is intended to include changes and variations fall within the scope of the claims of the application and the equivalent technologies thereof.

What is claimed is:

1. An information processing method applied on an electronic device, wherein the electronic device comprises a sensing unit, a functional main body and a fixing element,
   wherein the functional main body has a first side edge and a second side edge which are opposite to each other and a third side edge and a fourth side edge which are opposite to each other; the first side edge, the third side edge, the second side edge and the fourth side edge are connected in turn and end-to-end; the first side edge and the second side edge correspond to the fixing element;
   wherein the fixing element has a first end and a second end which are opposite to each other if the fixing element is in a fixed state with the functional main body;
   wherein the method comprises:
      detecting a connection state between the functional main body and the fixing element by the sensing unit, wherein the connection state indicates whether the first side edge is connected to the first end or the second end of the fixing element,
      determining a connection state parameter based on the connection state;
      determining wearing position data of the electronic device based on the connection state parameter, wherein the wearing position data indicates a positional relation between the electronic device and a wearer; and
      controlling the electronic device to operate in a working mode matching with the wearing position data,
   wherein determining the connection state parameter based on the connection state comprises:
      determining the connection state parameter as a first connection state parameter in a case that the first side edge is connected to the first end of the fixing element; and
      determining the connection state parameter as a second connection state parameter in a case that the first side edge is connected to the second end of the fixing element; and
   wherein determining the wearing position data of the electronic device based on the connection state parameter comprises:
      determining that the wearing position data is a first wearing position data based on the first connection state parameter, wherein the first wearing position data indicates that the electronic device is worn on a left part of a body of the wearer; and determining that the wearing position data is a second wearing position data based on the second connection state parameter, wherein the second wearing position data indicates that the electronic device is worn on a right part of the body of the wearer.

2. The method according to claim 1, wherein controlling the electronic device to operate in a working mode matching with the wearing position data comprises at least one of:
controlling the electronic device to display a display object in a display mode matching with the wearing position data; and
controlling the electronic device to respond to an input operation in a response mode matching with the wearing position data.

3. The method according to claim 1, wherein controlling the electronic device to operate in a working mode matching with the wearing position data comprises:
controlling the electronic device to take a direction from the first side edge to the second side edge as a forward display direction of a display unit of the electronic device in a case that the wearing position data is the first wearing position data; and
controlling the electronic device to take a direction from the second side edge to the first side edge as a forward display direction of a display unit of the electronic device in a case that the wearing position data is the second wearing position data.

4. The method according to claim 3, wherein
the third side edge is located on a right side of the display unit when the display unit is being viewed by the wearer in the forward display direction, and the fourth side edge is located on a left side of the display unit when the display unit is being viewed by the wearer in the forward display direction; and
controlling the electronic device to operate in a working mode matching with the wearing position data comprises at least one of:
controlling the electronic device to move a display position of a display object towards the third side edge in a case that it is determined that the wearing position data is the first wearing position data;
controlling the electronic device to move a display position of a display object towards the fourth side edge in a case that it is determined that the wearing position data is the second wearing position data;
controlling, if a touch control device is arranged on the third side edge, the touch control device on the third side edge to be in an enabled state in a case that it is determined that the wearing position data is the first wearing position data;
controlling, if a touch control device is arranged on the fourth side edge, the touch control device on the fourth side edge to be in an enabled state in a case that it is determined that the wearing position data is the second wearing position data;
controlling the electronic device to take a first touch operation of a user as a first preset input operation in a case that it is determined that the wearing position data is the first wearing position data, wherein the first touch operation is a touch operation performed on a touch region of the electronic device and towards the fourth side edge; and
controlling the electronic device to take a second touch operation of a user as a first preset input operation in a case that it is determined that the wearing position data is the second wearing position data, wherein the second touch operation is a touch operation performed on a touch region of the electronic device and towards the third side edge.

5. An electronic device, comprising:
a fixing element, configured to have at least a fixed state in which the fixing element forms at least a portion of an annulus, wherein the fixing element has a first end and a second end which are opposite to each other if the fixing element is in a fixed state with a functional main body; and
the functional main body, capable of maintaining a connection with the fixing element and capable of being fixed around at least a part of the body of a wearer by the fixing element, wherein the functional main body has a first side edge and a second side edge which are opposite to each other and a third side edge and a fourth side edge which are opposite to each other; the first side edge, the third side edge, the second side edge and the fourth side edge are connected in turn and end-to-end; the first side edge and the second side edge correspond to the fixing element;
wherein the functional main body comprises:
a display unit located on a first surface of the functional main body;
a sensing unit, configured to detect a connection state between the functional main body and the fixing element, wherein the connection state indicates whether the first side edge is connected to the first end or the second end of the fixing element; and
a processor connected to the display unit and the sensing unit, and configured to: determine a connection state parameter based on the connection state and determining wearing position data of the electronic device based on the connection state parameter, wherein the wearing position data indicates a positional relation between the electronic device and the wearer; and control the electronic device to operate in a working mode matching with the wearing position data,
wherein the processor determining the connection state parameter based on the connection state comprises:
determining the connection state parameter as a first connection state parameter in a case that the first side edge is connected to the first end of the fixing element; and
determining the connection state parameter as a second connection state parameter in a case that the first side edge is connected to the second end of the fixing element; and
wherein the processor determining the wearing position data of the electronic device based on the connection state parameter comprises:
determining that the wearing position data is a first wearing position data based on the first connection state parameter, wherein the first wearing position data indicates that the electronic device is worn on a left part of a body of the wearer; and
determining that the wearing position data is a second wearing position data based on the second connection state parameter, wherein the second wearing position data indicates that the electronic device is worn on a right part of the body of the wearer.

6. The electronic device according to claim 5, wherein the processor is configured to:
control the electronic device to take a direction from the first side edge to the second side edge as a forward display direction of the display unit of the electronic device in a case that it is determined that the wearing position data is the first wearing position data; and control the electronic device to take a direction from the second side edge to the first side edge as a forward display direction of the display unit of the electronic device in a case that it is determined that the wearing position data is the second wearing position data.

7. The electronic device according to claim 6, wherein the third side edge is located on a right side of the display unit when the display unit is being viewed by the wearer in the forward display direction, and the fourth side edge is located on a left side of the forward display direction of the display unit when the display unit is being viewed by the wearer in the forward display direction; and the processor is configured to: control the electronic device to move a display position of a display object towards the third side edge in a case that it is determined that the wearing position data is the first wearing position data; and control the electronic device to move the display position of the display object towards the fourth side edge in a case that it is determined that the wearing position data is the second wearing position data.

8. The electronic device according to claim 6, wherein the third side edge is located on a right side of the display unit when the display unit is being viewed by the wearer in the forward display direction, and the fourth side edge is located on a left side of the display unit when the display unit is being viewed by the wearer in the forward display direction;

the functional main body further comprises touch control devices arranged on the third side edge and the fourth side edge respectively; and the processor is configured to: control the touch control device on the third side edge to be in an enabled state in a case that it is determined that the wearing position data is the first wearing position data; and control the touch control device on the fourth side edge to be in an enabled state in a case that it is determined that the wearing position data is the second wearing position data.

9. The electronic device according to claim 6, wherein the third side edge is located on a right side of the display unit when the display unit is being viewed by the wearer in the forward display direction, and the fourth side edge is located on a left side of the display unit when the display unit is being viewed by the wearer in the forward display direction;

the display unit is a touch control display unit; and the processor is configured to: control the electronic device to take a first touch operation of a user as a first preset input operation in a case that it is determined that the wearing position data is the first wearing position data, wherein the first touch operation is a touch operation performed on the touch control display unit and towards the fourth side edge; and control the electronic device to take a second touch operation of a user as a first preset input operation in a case that it is determined that the wearing position data is the second wearing position data, wherein the second touch operation is a touch operation performed on the touch control display unit and towards the third side edge.

* * * * *